US012269033B2

(12) United States Patent
Taagaard et al.

(10) Patent No.: US 12,269,033 B2
(45) Date of Patent: Apr. 8, 2025

(54) DEVICE FOR ACCOMMODATING A FLUID SAMPLE

(71) Applicant: Radiometer Medical ApS, Brønshøj (DK)

(72) Inventors: Michael Taagaard, Brønshøj (DK); Peter Frischauf, Brønshøj (DK)

(73) Assignee: Radiometer Medical ApS, Brønshøj (DK)

( * ) Notice: Subject to any disclaimer, the term of this patent is extended or adjusted under 35 U.S.C. 154(b) by 172 days.

(21) Appl. No.: 16/954,733

(22) PCT Filed: Dec. 19, 2018

(86) PCT No.: PCT/EP2018/085726
§ 371 (c)(1),
(2) Date: Jun. 17, 2020

(87) PCT Pub. No.: WO2019/121841
PCT Pub. Date: Jun. 27, 2019

(65) Prior Publication Data

US 2021/0162411 A1 Jun. 3, 2021

(30) Foreign Application Priority Data

Dec. 21, 2017 (DK) ........................... PA 2017 00739

(51) Int. Cl.
*B01L 3/00* (2006.01)

(52) U.S. Cl.
CPC . *B01L 3/502746* (2013.01); *B01L 2200/0684* (2013.01); *B01L 2300/0663* (2013.01);
(Continued)

(58) Field of Classification Search
CPC ....... B01L 3/502746; B01L 2200/0684; B01L 2300/0663; B01L 2300/0816;
(Continued)

(56) References Cited

U.S. PATENT DOCUMENTS 5,885,527 A 3/1999 Buechler
2006/0068490 A1* 3/2006 Tang .................... B01F 25/421
435/287.2
(Continued)

FOREIGN PATENT DOCUMENTS

CN 101641157 A 2/2010
CN 101715556 A 5/2010
(Continued)

OTHER PUBLICATIONS

International Search Report for International Application No. PCT/EP2018/085726, Jan. 31, 2019 (three pages).
(Continued)

*Primary Examiner* — Dennis White
(74) *Attorney, Agent, or Firm* — Frost Brown Todd LLP

(57) ABSTRACT

The invention relates to a multiple-use device (1), wherein a fluid sample, in particular a blood sample, may enter a measuring chamber (3) of the device (1) via an inlet (16), flow through the measuring chamber (3) and leave the measuring chamber (3) via an outlet (17). The device (1) comprises an inner wall surface (9) defining an outer limit of the measuring chamber (3) The inner wall surface (9) comprises a surface structure (13) which is adapted to control a propagation of a flow front (6) of the fluid sample (4) in a direction (x) while the fluid sample (4) enters into the measuring chamber (3) via the inlet (16), while the fluid sample (4) flows through the measuring chamber (3), and while the fluid sample (4) leaves the measuring chamber (3) via the outlet (17). The shape of the surface structure (13) may be selected depending on a flow speed of the flow front (6) of the fluid sample (4), wherein the flow speed may be applied by a difference in pressure between the inlet (16) and the outlet (17) of the measuring chamber (3).

23 Claims, 8 Drawing Sheets

(52) U.S. Cl.
CPC .................. *B01L 2300/0816* (2013.01); *B01L 2300/0858* (2013.01); *B01L 2300/0887* (2013.01); *B01L 2300/161* (2013.01); *B01L 2400/0406* (2013.01); *B01L 2400/049* (2013.01); *B01L 2400/086* (2013.01)

(58) Field of Classification Search
CPC ..... B01L 2300/0858; B01L 2300/0887; B01L 2300/161; B01L 2400/0406; B01L 2400/049; B01L 2400/086; B01L 2400/0487
See application file for complete search history.

(56) References Cited

U.S. PATENT DOCUMENTS

| | | | | |
|---|---|---|---|---|
| 2007/0048858 | A1 | 3/2007 | Aizenberg et al. | |
| 2008/0317632 | A1* | 12/2008 | Shimasaki | B01D 19/0031 422/68.1 |
| 2009/0060789 | A1* | 3/2009 | Aas | G01N 33/4915 422/68.1 |
| 2010/0189601 | A1* | 7/2010 | Crawford | B01L 3/502746 422/69 |
| 2016/0061826 | A1* | 3/2016 | Sohn | G01N 27/44791 204/403.01 |
| 2016/0361715 | A1 | 12/2016 | Shi et al. | |

FOREIGN PATENT DOCUMENTS

| | | | |
|---|---|---|---|
| CN | 103582816 | A | 2/2014 |
| CN | 103718019 | A | 4/2014 |
| CN | 105572334 | A | 5/2016 |
| EP | 1 196 243 | B1 | 6/2004 |
| JP | 2003-302399 | | 10/2003 |
| JP | 2006-242607 | A | 9/2006 |
| JP | 2010-522337 | | 7/2010 |
| JP | 2010-525338 | | 7/2010 |
| WO | WO 2005/064349 | A2 | 7/2005 |
| WO | WO 2008/114063 | A1 | 9/2008 |
| WO | WO 2008/131767 | A1 | 11/2008 |
| WO | WO 2016/098740 | A1 | 6/2016 |

OTHER PUBLICATIONS

Written Opinion of the International Searching Authority for International Application No. PCT/EP2018/085726 (seven pages).

* cited by examiner

DEVICE FOR ACCOMMODATING A FLUID SAMPLE

This application is a national stage filing under 35 U.S.C. § 371 of International Application No. PCT/EP2018/085726, filed on Dec. 19, 2018, which claims priority of Danish Patent Application No. PA 2017 00739, filed on Dec. 21, 2017. The contents of these applications are each incorporated herein by reference in their entirety.

FIELD OF THE INVENTION

The invention relates to a device for accommodating a fluid sample, especially a body fluid sample such as a blood sample. Furthermore, the invention relates to an analysis apparatus comprising the device for accommodating the fluid sample, wherein the analysis apparatus may be adapted to conduct a blood gas analysis. Additionally, the invention relates to a method for analysing a fluid sample which is stored within a device for accommodating a fluid sample.

BACKGROUND OF THE INVENTION

It is known to fill a measuring chamber of a device for accommodating a fluid sample with a blood sample. The device can be a sensor cassette or a part of it, wherein the cassette is accommodated within an analysis apparatus, which is adapted to analyse the blood sample, in particular to conduct a blood gas analysis.

If the measuring chamber is filled and emptied in an optimal way, the fluid should follow a symmetrically propagation shape or path. However, in some cases, a certain ratio between a surface tension inside the measuring chamber and the fluid causes the propagation shape of the fluid to be asymmetrically. This will increase the risk for trapped air within the sample and residual sample after emptying the measuring chamber. This is a well-known problem for analysers with small dimensions fluid pathways and micro-channels. Changing the surface tension inside the measuring chamber (silicone) worsens the problem with air entrapments and residual sample after emptying the measuring chamber. This type of problems may at least partly be solved by avoiding silicone, by changing the surface tension of the fluid or by changing the surface tension inside the measuring chamber.

SUMMARY OF THE INVENTION

It is an object of the present invention to provide an alternative device for accommodating a fluid sample, which enables to decrease the risk for trapped air in the measuring chamber and residual sample after emptying the measuring chamber.

The problem is solved by the subject matter according to the independent claims. The dependent claims, the following description and the drawings show embodiments of the invention.

The present application proposes to secure a well-controlled filling and emptying of a measuring chamber with a fluid sample by using a restricted fluid propagation technology. In particular, a fluid propagation may be restricted at a wall of the measuring chamber compared to the center of the fluid front. In one embodiment, this is achieved by limiting a range of capillary forces to work in segments of limited size. The restriction of fluid propagation enables to decrease the risk for a too asymmetrically shape of the flow front of the fluid. In particular, it is enabled that the flow front does not propagate too far ahead or behind in the area of the surface structure compared to the center of the flow front. Thereby, the risk for trapped air in the sample and the risk of a residual sample after emptying the measuring chamber can be reduced.

According to a first aspect of the invention, a device is provided. The device may be a multiple-use device. In this context, "multiple use" especially means that you can use the device several times. For example, you can fill a measuring chamber of the device with a fluid sample, and then analyse the fluid sample by means of suitable sensors. Subsequently, the measuring chamber may be rinsed by use of a suitable rinsing liquid. Furthermore, a quality control step may be executed to ensure that the sensors are ready and set for analysing a next fluid sample. For example, the measuring chamber may be filled with a quality control liquid (after aforesaid rinsing step). If readouts from those liquids lie in a certain range, this may indicate that the sensors are performing as intended and that the device is ready for accommodating and analysing a next fluid sample.

The device, in general, may be adapted for accommodating a fluid sample. Especially, the device may comprise an inlet and an outlet, wherein a fluid sample may enter a measuring chamber of the device via the inlet, may flow through the measuring chamber and may leave the measuring chamber via the outlet. In particular, the device may be adapted to enable a flow path of the fluid sample which runs uni-directionally through a multiple use device, i.e. only in one direction. Although the device is intended for uni-directionally flow it may be necessary in connection with a rinsing or cleaning procedure to revert the flow shortly. The fluid sample may be a biological sample e.g. a physiological fluid such as diluted or undiluted whole blood, serum, plasma, saliva, urine, feces, pleura, cerebrospinal fluid, synovial fluid, milk, ascites fluid, dialysis fluid, peritoneal fluid or amniotic fluid. Examples of other biological samples include fermentation broths, microbial cultures, waste water, food products and the like. The fluid may also be another liquid. The liquid may be selected from: quality control material, a rinse solution, buffer, calibration solution, etc.

The device can be a sensor cassette or a part of it. The sensor cassette may be used in an analysis apparatus, especially in an analysis apparatus for conducting a blood gas analysis. For example, EP2147307B1 of the applicant discloses a sensor cassette/sensor assembly in which the device as taught by the present application can be implemented advantageously. Said sensor cassette/sensor assembly comprises discrete analyte sensors arranged side by side on a substrate (cis-configuration) and on an opposing substrate (trans-configuration). The device may comprise an inner wall surface defining an outer limit of the measuring chamber for accommodating the fluid sample. The inner wall surface can be formed by a body part of the device. In some embodiments the measuring chamber comprises 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 sensors. In some embodiments the measuring chamber comprises at least one, at least two, at least three, at least four, at least five, at least six, at least seven, at least nine, at least 10, at least 11, at least 12, at least 13, at least 14, at least 15, at least 16, at least 17, at least 18, at least 19, or at least 20 sensors. The sensors can be arranged on a first substrate and/or on a second substrate, wherein the device according to the present invention can be sandwiched between the first substrate and the second substrate. Furthermore, the measuring chamber may be transparent, such that the fluid sample, especially the blood sample, can be analysed by suitable sensors located outside of the measuring chamber. The sensors may also be arranged on a substrate which is folded or rolled whereby the sensors face each other as described in e.g. WO 2016/106320 and WO 2013/163120.

To avoid that the liquid sample propagates in a too asymmetrically way within the measuring chamber when the measuring chamber is filled with the fluid sample or when the measuring chamber is emptied, the inner wall surface may comprise a surface structure. The surface structure may be adapted to control a propagation of a flow front of the fluid sample in a direction, while the fluid sample enters into the measuring chamber via the inlet, while the fluid sample flows through the measuring chamber, and while the fluid sample leaves the measuring chamber via the outlet. Similarly, the surface structure may be adapted to control a propagation of an end surface (running opposite to the flow front) on the very back of the fluid sample in the said direction, especially while the fluid sample flows through the measuring chamber, and while the fluid sample leaves the measuring chamber via the outlet. Said end surface may be a gas front, in particular an air front that propagates through the measuring chamber, especially in the same direction as the flow front of the fluid sample propagates through the measuring chamber.

The surface structures may be present on all the walls or surfaces of the measuring chamber which are in contact with the fluid or it may be present on a part or section of said walls or surfaces. In one embodiment the surface structure (13) is present on the inner wall surface (9) defining the outer limit of a measuring chamber (3) for accommodating a fluid sample (4). In one embodiment the surface structure is present on a section of the inner wall surface (9) defining the outer limit of a measuring chamber (3) for accommodating a fluid sample (4). In one embodiment, the surface structure is present on one or more sections of the inner wall surface, which extends from inlet to outlet of the measuring chamber. In one embodiment, the surface structure is present on one or more sections of the inner wall surface, which partly extends from inlet to outlet of the measuring chamber. In one embodiment, the surface structure is present on the same inner wall surface as the one or more sensors, such as e.g. on a sensor substrate. In one embodiment, the surface structure is present on a different inner wall surface as the one or more sensors, such as e.g. on a spacer, a gasket, or another component providing an inner wall surface. The fluid flow is controlled by having the surface structures preferably evenly distributed on the inner wall surface. In one embodiment, the surface structures are present on two or more sections of the inner wall surface extending from inlet to outlet which sections are located opposite each other or distributed evenly or almost evenly at the periphery of a cross section of the measuring chamber perpendicular on the flow direction X. In one embodiment, the surface structures present on two or more sections of the inner wall surface are partly extending from inlet to outlet. In one embodiment one or more sections may be 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 sections. In one embodiment one or more sections may be at least 1, 2, 3, 4, 5, 6, 7, 8, 9, 10, 11, 12, 13, 14, 15, 16, 17, 18, 19, 20, 21, 22, 23, 24, 25, 26, 27, 28, 29, or at least 30 sections.

The surface structure may be selected depending on a flow speed of the flow front of the fluid sample, wherein the flow speed may be applied by a difference in pressure between the inlet and the outlet of the measuring chamber. For example, a vacuum can be applied to the outlet of the measuring chamber such that the fluid sample is sucked into the measuring chamber via the inlet. Alternatively, an over pressure having a value above an atmospheric pressure may be applied to the inlet of the measurement chamber, such that the fluid sample is pushed into the measuring chamber. The pressure difference between the inlet and the outlet can e.g. be from 0 and up to including 0.40 of the atmospheric pressure (atm), such as e.g. about 0.01; 0.02; 0.03; 0.04; 0.05; 0.10; 0.15; 0.20; 0.25; 0.30; 0.35; or 0.40. Such a pressure difference may lead to a flow speed of the fluid sample from 0 and up to including 100 mm/s, such as e.g. around 5; 10; 15; 20; 25; 30; 35; 40; 45; 50; 55; 60; 65; 70; 75; 80; 85; 90; 95; or 100 mm/s.

The surface structure may prevent that the fluid sample enters the measuring chamber by capillary forces. Instead, a pressure difference has to be applied between the inlet and the outlet (either a vacuum at the outlet or an overpressure at the inlet as described above) such that the fluid sample is forced to enter the measuring chamber. The pressure difference also enables that the measuring chamber can be emptied again, in particular after a measurement has been conducted. Ideally, the pressure difference forces the whole fluid sample, that has entered the measuring chamber, to leave the measuring chamber again after a measuring. The speed of the flow front may be adjusted depending on the shape of the surface structure.

The surface structure may comprise alternating elevations and reductions or indentations. The surface structure may comprise at least one surface structure element, which is adapted to weaken or amplify capillary forces in the fluid sample along the surface structure.

In particular, the surface structure elements or at least one surface structure element may have a shape selected from semi-circular, semi-ellipsoidal, triangular, trapezoidal, parallelogram, rectangular, square, any fusions thereof, and any combinations thereof. Also, the surface structure may be in phase or out of phase.

The dimension of the surface structure elements may vary. The width (w) at the basis of the surface structure elements may be 1 mm or below, such as e.g. below 1.00; 0.90; 0.80; 0.75; 0.70; 0.65; 0.60; 0.55; 0.50; 0.45; 0.40; 0.35; 0.30; 0.25; 0.20; 0.15; 0.10; 0.05; 0.04; 0.03; 0.02; or 0.01 mm. The high (h) of the surface structure elements may be 1 mm or below, such as e.g. below 1.00; 0.90; 0.80; 0.75; 0.70; 0.65; 0.60; 0.55; 0.50; 0.45; 0.40; 0.35; 0.30; 0.25; 0.20; 0.15; 0.10; 0.05; 0.04; 0.03; 0.02; or 0.01 mm.

The measuring chamber may have the shape of a microchannel. The measuring chamber, especially the microchannel, can comprise very small dimensions. For example, the measuring chamber, especially the microchannel, can have a length of about 10 up to including 60 mm, about 10; 15; 20; 25; 30; 35; 40; 45; 50; 55; or 60 mm, in particular 30; 31; 32; 33; 34; or 35 mm. The width of the measuring chamber, especially the microchannel, can including the end points e.g. be between 1 and 5 mm; 1 and 4 mm; 1 and 3 mm; 2 and 5 mm; 3 and 5 mm; 2 and 4 mm; 2 and 3 mm, in particular 2.0; 2.1; 2.2; 2.3; 2.4; 2.5; 2.6; 2.7; 2.8; 2.9; or 3.0 mm. Furthermore, the depth of the measuring chamber, especially the microchannel, can be from 0.2 and up to including 0.6 mm, such as e.g. 0.20; 0.25; 0.30; 0.35; 0.40; 0.45; 0.50; 0.55; or 6.00 mm. Due to the surface structure, in a measuring chamber, especially in a microchannel, with such dimensions, the occurrence of a capillary action is not likely, when the measuring chamber, especially the microchannel, is filled with a fluid sample, such as a biological sample such as diluted or undiluted whole blood, serum, plasma, saliva, urine, feces, pleura, cerebrospinal fluid, synovial fluid, milk, ascites fluid peritoneal fluid or amniotic fluid, or dialysis liquid sample, quality control material, etc. Instead the measuring chamber is filled by applying a pressure difference between the inlet and the outlet, e.g. a vacuum.

While the fluid sample flows through the measuring chamber, the propagation direction of the fluid sample may be parallel or in the direction of a longitudinal axis of the measuring chamber, especially the microchannel. The surface structure may enable to restrict the fluid propagation to progress in steps. The surface structure secures that the fluid front at either one or both of the walls does not run ahead too fast compared to the fluid front situated in the middle of the measuring chamber or that the fluid front situated in the middle of the measuring chamber does not run ahead too fast compared to the fluid front at the wall. Thereby, it is possible to decrease the risk for a too asymmetrically fluid shape and, as a result, the risk for trapped air in the fluid sample and the risk of a residual sample in the measuring chamber after emptying the measuring chamber can be reduced. Additionally, the number of errors related to poor wettability, for example aborted samples, inhomogeneous liquids or other liquid transport related errors, may be decreased. In one embodiment of the invention, the surface structures are present on at least one surface wall or section of a surface wall extending from inlet to outlet in the flow direction (x). Accordingly, there may be one or more sections of the walls extending from inlet to outlet in the flow direction (x) without presence of surface structures. In a further embodiment, the surface structures are present on one, two, three, four, five, six, seven, eight, nine, ten, eleven, twelve, thirteen, fourteen, fifteen, sixteen, seventeen, eighteen, nineteen, or twenty surface walls or part of surface walls. In a further embodiment the surface structures are present on at least one, two, three, four, five, six, seven, eight, nine, ten, eleven, twelve, thirteen, fourteen, fifteen, sixteen, seventeen, eighteen, nineteen, or at least twenty surface walls or part of surface walls. In one embodiment, the surface structures are present at at least two surface walls or part of a surface wall which are located opposite each other. If the surface structures are present at at least two or more surface walls or part of a surface wall said walls or part of walls extending from inlet to outlet in the direction (x) are preferably distributed evenly or mostly evenly around the periphery of the measuring chamber.

An expansion angle $\alpha$ may define an angle between a direction, into which the fluid sample is flowing (i.e. the propagation direction of the fluid sample; this direction may be perpendicular to the flow front of the fluid sample), and a tangent of an edge of a surface structure element. A positive value may occur, if a cross section of the measuring chamber expands, while a negative value may occur, if the cross section of the measuring chamber contracts. The expansion angle $\alpha$ may vary within a range from $-90°$ up to $+90°$. However, other values also may be suitable.

The body part or another part of the device, which forms the surface structure of the inner wall surface, may made of a material selected from poly(methyl methacrylate), polyethylene terephthalate, polytetrafluoroethylene, polycarbonates, polystyrene, polyethylene, polypropylene, polyvinyl chloride, nylon, polyurethane or styrene dimethyl methacrylate copolymer, or any combination thereof.

In an embodiment, the surface structure may be adapted to increase capillary forces of the fluid sample along the surface structure, such that the fluid sample progresses in steps or small steps in the direction of the fluid propagation in the area of the surface structure.

In another embodiment, the inner wall surface may comprise a first wall section and a second wall section. The first wall section may run substantially parallel to the second wall section, wherein the measuring chamber may extend between the first wall section and the second wall section. Additionally, the direction of the fluid propagation may run substantially parallel to the first wall section and/or to the second wall section.

In an embodiment, the first wall section and the second wall section may comprise the same surface structure. Furthermore, the surface structure of the second wall section may be axis-symmetric to the surface structure of the first wall section.

In an embodiment, the surface structure is made by surface structure elements. In an embodiment, the surface structure may be the same in the first wall section and/or in the second wall section. For example, a surface structure element may be distributed uniformly along or across the whole surface structure in the first wall section and/or in the second wall section. Alternatively, the surface structure may comprise two or more different surface structure elements along or across the surface structure in the first wall section and/or in the second wall section. Thus, the shape of the surface structure also may be different in the first wall section and/or in the second wall section.

In an embodiment, the surface structure may be adapted to control the propagation of the fluid sample in the said direction, such that the fluid sample propagates a first step in the area of the first wall section and, subsequently, a second step in the area of the second wall section.

In particular, the first step in the area of the first wall section may start at a first elevation of the first wall section and may end at a second elevation of the first wall section, wherein the second elevation is adjacent to the first elevation. Also, the second step in the area of the second wall section may start at a first elevation of the second wall section and may end at a second elevation of the second wall section, wherein the second elevation is adjacent to the first elevation. The described first step and second step may be examples of the “small” step described above.

Furthermore, the surface structure may be adapted to control the propagation of the fluid sample in said direction, such that the whole flow front is moving with one side (e.g. the side where the first wall section is located) e.g. a small distance ahead of the other side (e.g. the side where the second wall section is located). Thus, instead of an exactly linear running flow front, one side of the flow front can be in lead or ahead of the other side all the time. Said “small distance” (e.g. in the range of up to 1 mm or a few millimetres) can be kept small enough by means of the shape of the surface structure in order to prevent bubbles from being trapped within the fluid sample and in order to avoid a residual volume of the fluid sample within the measuring chamber, after the measuring chamber has been emptied.

According to a second aspect of the invention, an analysis apparatus is provided which comprises a multiple-use device according to the first aspect of the invention. In an embodiment, the analysis apparatus is adapted to analyse a blood sample which is accommodated within the multiple-use device. In particular, the analysis apparatus may be adapted to conduct a blood gas analysis. Furthermore, the analysis apparatus may be adapted to measure other components which are present in the sample.

According to a third aspect of the invention, a method for analysing a fluid sample is provided, wherein the fluid sample is accommodated within a multiple-use device according to the first aspect of the invention. The method may comprise a step 100 of providing an analysis apparatus according to the second aspect of the invention. The analysis apparatus may comprise a multiple-use device according to the first aspect of the invention. In a step 200, a fluid sample may be filled into the measuring chamber of the multiple-use device. Additionally, in a step 300, the fluid sample accommodated within the measuring chamber of the multiple-use device may be analysed by means of the analysis apparatus. After the analysis of the fluid sample has been completed, the measurement chamber may be emptied in a step 400, especially via the outlet. This may be done by applying a vacuum to the outlet or an over pressure to the inlet as described above in context with the filling of the measurement chamber.

Subsequently, in a step 500, the measuring chamber may be rinsed by use of a suitable rinsing liquid. Furthermore, in a step 600, a calibration step may be executed to ensure that the sensors are ready and set for analysing a next fluid sample. For example, the measuring chamber may be filled with a quality control liquid (after aforesaid rinsing step). If readouts from those liquids lie in a certain range, this may indicate that the sensors are performing as intended and that the device is ready for accommodating and analysing a next fluid sample. Then, aforesaid steps 200 to 500 or 200 to 600 may be repeated, in particular with a different fluid sample. In an embodiment, the fluid sample is a blood sample, and the analysing comprises a blood gas analysis.

BRIEF DESCRIPTION OF THE DRAWING

In the following description, exemplary embodiments of the invention are explained with reference to the accompanying schematically drawing, wherein the same or similar elements are provided with the same reference sign.

FIG. 1 shows a device 1 with a body part 2, which forms a measuring chamber, in the shown example in the form of a microchannel 3. The microchannel 3 is filled with a fluid sample 4, wherein the fluid sample 4 propagates in a direction x of a fluid propagation. In the shown example, this direction x is substantially identical with a longitudinal direction of the microchannel 3. As shown by FIG. 1, a first volume (shown in the right part of FIG. 1) of the microchannel 3 is filled with the fluid sample 4, whereas a second volume (shown in the left part of FIG. 1) of the microchannel 3 is not filled with the fluid sample 4, but with air 5. A frontier between the air 5 on the left side and the fluid sample 4 on the right side within the microchannel 3 defines a flow front 6 of the fluid sample 4.

FIG. 1 shows an ideally and desired optimal filling process of the measuring chamber 3, wherein the fluid sample 4 follows a symmetrically propagation and comprises a symmetrical flow front 6 which may be convex or concave (symmetrical to the longitudinal axis of the microchannel 3).

FIG. 2 shows a similar device 1 as that per FIG. 1. However, in the example as shown by FIG. 2, a certain ratio between a surface tension inside the measuring chamber 3 and the fluid sample 4 causes the propagation of the fluid sample 4 to be asymmetrically, such that the fluid sample 4 comprises an asymmetrical flow front 6. This increases the risk for trapped air in the measuring chamber 3. The asymmetrical shape can be concave or convex. Furthermore, it is undesirable, if the center of the flow front 6 is too far ahead or too far behind the flow front 6 at the walls, even if the flow front 6 is symmetrical.

FIG. 3 is an exploded view of a known sensor assembly 1' comprising a first substrate 2', a second substrate 3' and a spacer 4'. The first substrate 2' is provided with a plurality of analyte sensors (not visible in FIG. 3) arranged on a first surface of the first substrate and facing downward in FIG. 3. The first substrate 2' is furthermore provided with a plurality of electrical contact points 5*c* arranged on a second surface facing upwards in FIG. 3. The electrical contact points 5*c* are connected to analyte sensors via wires 5*b* and tiny bores 5*a* in the sensor board. The bores 5*a* are filled with an electrical conductive material, e.g. platinum, which is connected to the analyte sensors on the first surface and the wire 5*b* on the second surface.

The second substrate 3' is also provided with a plurality of analyte sensors 6' and a plurality of electrical contact points 5*c*. The analyte sensors 6' as well as the electrical contact points 5*c* are arranged on a first surface of the second substrate 3' and facing upwards in FIG. 3. The wiring between the analyte sensors 6' and the electrical contact points 5*c* on the second substrate 3' is lead from the analyte sensors on the first surface to the second surface of the substrate 3' and back to the contacts points 5*c* on the first surface through holes in the substrate. The sensor assembly 1' shown in FIG. 3 discloses the substrates 2' and 3' provided with a plurality of analyte sensors. The spacer 4' is provided with a recess 7' in the form of an elongated bore extending through the major part of the spacer 4'.

When the sensor assembly 1' is assembled, the first surface of the first substrate 2' and the first surface of the second substrate 3' will face each other, and the spacer part 4' will be positioned between the first substrate 2' and the second substrate 3' and the recess 7' together with first surfaces of the substrates 2' and 3' form a measuring chamber 7*a*. The measuring chamber 7*a* will be positioned in such a manner that the analyte sensors of the first substrate 2' as well as the analyte sensors 6' of the second substrate 3' are in fluid contact with the measuring chamber 7*a*. Accordingly, the recess 7' in combination with the substrates 2', 3' define a measuring chamber 7*a* in which a fluid sample may be accommodated.

When a fluid sample is positioned in the measuring chamber 7*a*, each of the analyte sensors 6' will thereby be in contact with the sample, and each of the analyte sensors 6' is accordingly capable of measuring relevant parameters of the sample. The fluid sample enters the measuring chamber 7*a* through the inlet 52 and exits through the outlet 53.

The measuring chamber may provide a volume of about 25-45 μL such as e.g. 25; 30; 35; 40; 45 μL. The dimensions of the recess 7' may be within the following ranges: length 10-60 mm such as e.g. 10; 20; 25; 30; 35; 40; 45; 50; 55; or 60 mm; width 1-5 mm such as e.g. 1.0; 1.5; 2.0; 2.5; 3.0; 3.5; 4.0; 4.5; or 5.0 mm; and thickness 0.2-0.6 mm such as e.g. 0.20; 0.25; 0.30; 0.35; 0.40; 0.45; 0.50; 0.55; or 0.60 mm.

Figure 1:
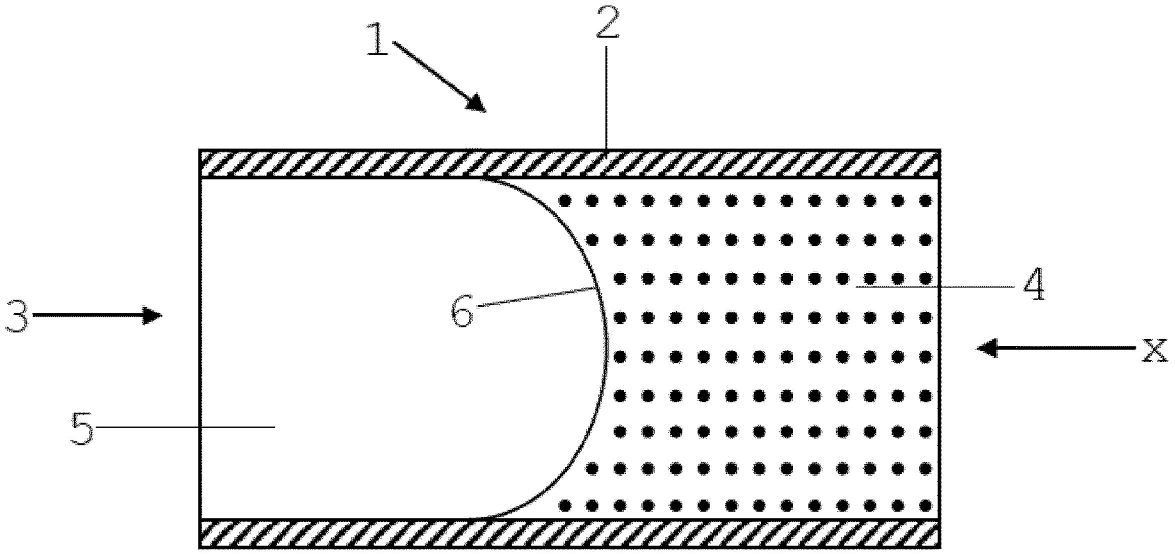
FIG. 1 shows a longitudinal sectional view of a microchannel being filled with a fluid sample having a symmetrical flow front.
Figure 2:
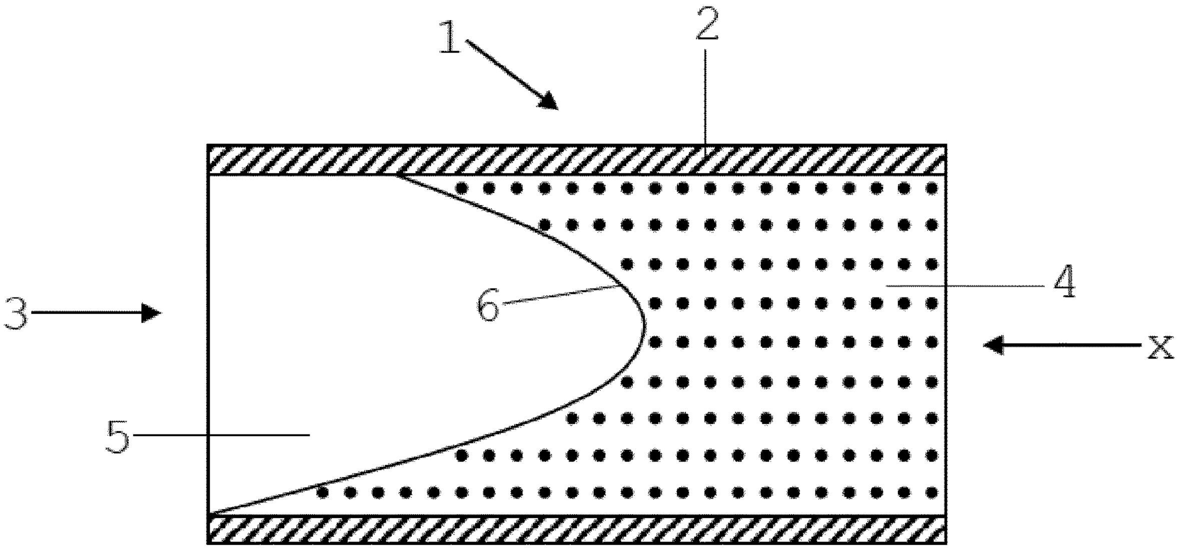
FIG. 2 shows a longitudinal sectional view of a microchannel being filled with a fluid sample having an asymmetrical flow front.
Figure 3:
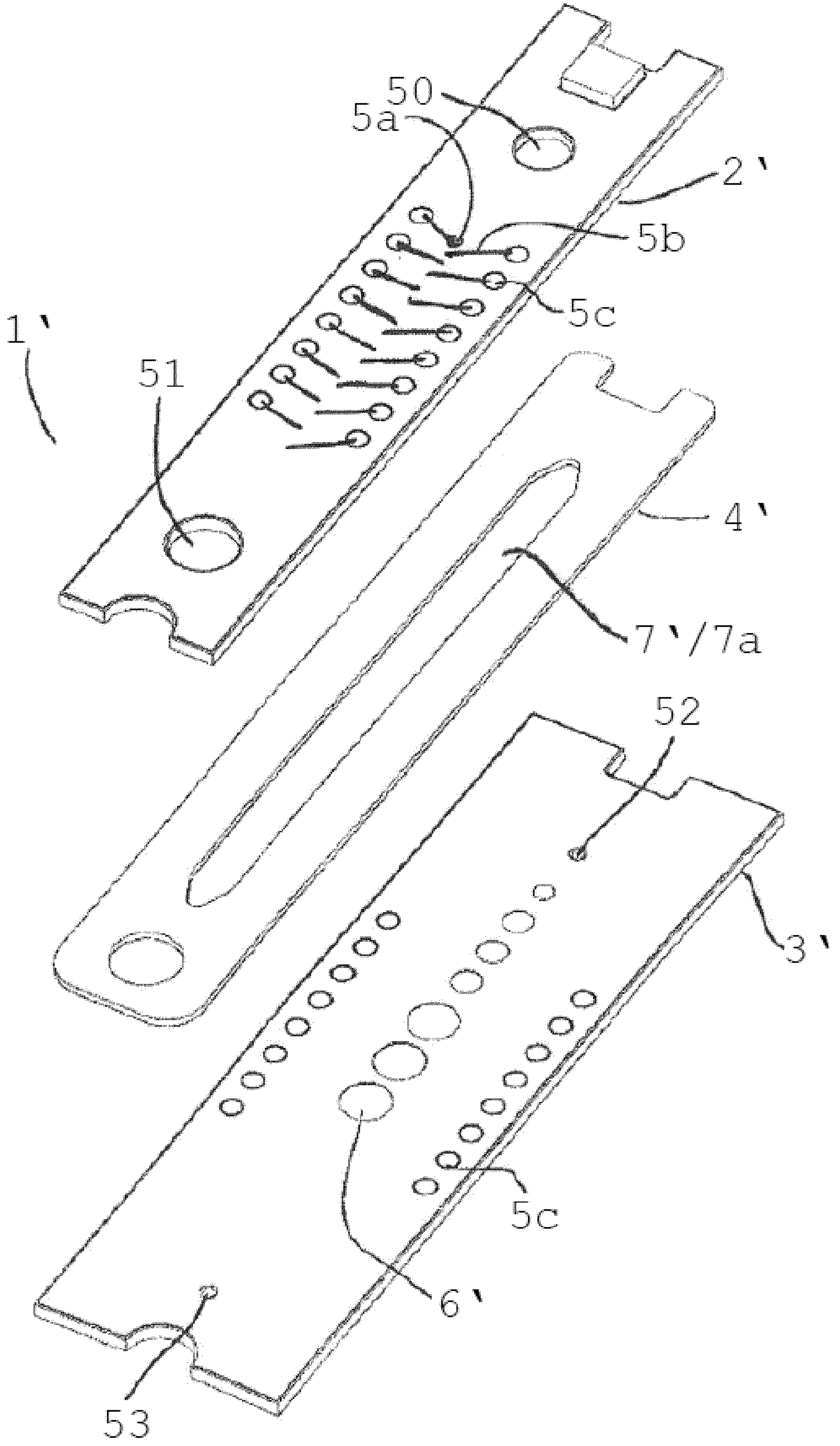
FIG. 3 shows an exploded perspective view of a sensor cassette/system as disclosed by EP2147307B1 of the applicant.

The spacer 4' as per FIG. 3 can be modified to include surface structure elements as taught by the present application, providing a multiple-use device 1 as shown per the following Figures. The measuring chamber 3 of the multiple-use device 1 can have similar or the same dimensions and capacity as the sensor assembly as per FIG. 3.

Figure 4:
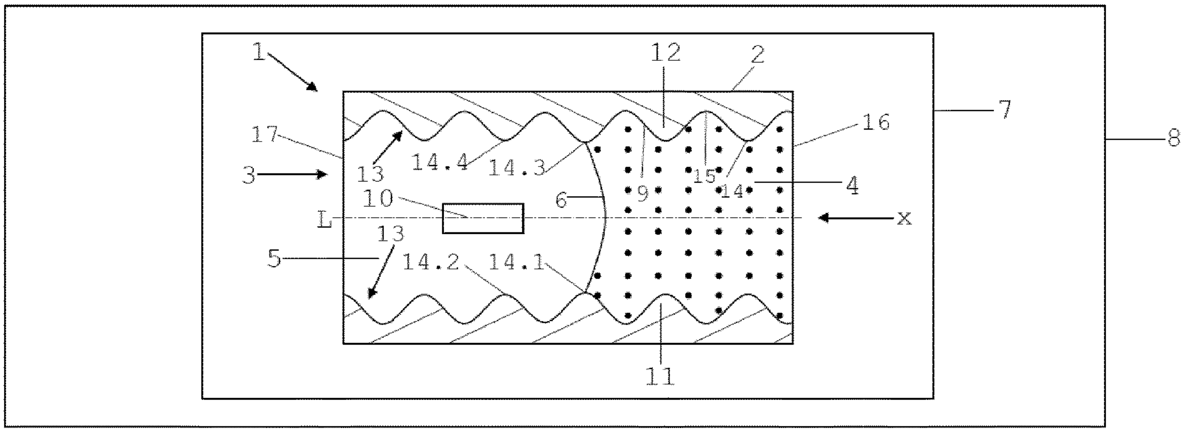
FIG. 4 shows a longitudinal sectional view of an analysis apparatus comprising a sensor cassette with a multiple-use device according to an exemplary embodiment of the present invention, wherein a fluid sample in a microchannel of the device has a symmetrical flow front.

FIG. 4 shows a multiple-use device 1 according to an embodiment of the present invention, wherein a fluid sample 4 may enter a measuring chamber 3 of the device 1 via an inlet 16, may flow through the measuring chamber 3 and may leave the measuring chamber 3 via an outlet 17. In particular, the device 1 may be adapted to enable a flow path of the fluid sample 4 which runs uni-directionally through a multiple-use, i.e. only in one direction (from the inlet 16 through the measuring chamber 3 to the outlet 17). In the shown example, the fluid sample may be a blood sample. However, the fluid sample may e.g. also be another liquid, such as a rinse solution, a pleura, a dialysis liquid sample, or a quality control material. The device 1 may be a part of a sensor cassette 7 which is incorporated into an analysis apparatus 8 for analysing the fluid sample. Both, the sensor cassette 7 and the analysis apparatus 8 are not shown in further detail in FIG. 4. The sensor assembly shown in EP2147307B1 of the applicant may be modified by incorporating surface structure elements of the present application thereby providing a multi-use device according to the invention. The analysis apparatus 8 may be adapted to conduct a blood gas analysis of the blood sample 4, when the blood sample is accommodated within a measuring chamber 3 of the device 1.

In the embodiment as per FIG. 4, the device 1 comprises a body part 2 which forms an inner wall surface 9. The body part 2 may be made of a material selected from poly(methyl methacrylate), polyethylene terephthalate, polytetrafluoroethylene, polycarbonates, polystyrene, polyethylene, polypropylene, polyvinyl chloride, nylon, polyurethane or styrene dimethyl methacrylate copolymer, or any combination thereof. The inner wall surface 9 defines an outer limit of the measuring chamber 3 for accommodating the fluid sample 4 within the device 1.

Figure 5:
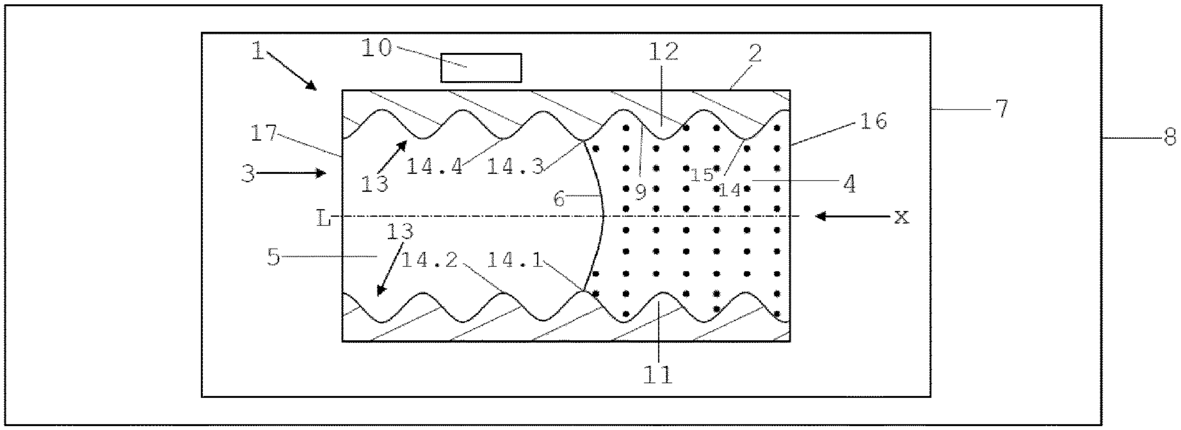
FIG. 5 shows a longitudinal sectional view of the analysis apparatus as per FIG. 4, wherein a sensor system is arranged at a different position.

As shown by FIG. 4. A sensor system 10 may be located inside the measuring chamber. This sensor system 10 may comprise the plurality of analyte sensors as described in conjunction with FIG. 3. Alternatively, as shown by FIG. 5, the measuring chamber 3 may be transparent, such that the fluid sample 4, especially the blood sample, can be analysed by a suitable sensor system 10 which is located outside of the measuring chamber 3.

In the embodiment as per FIG. 4, the measuring chamber 3 comprises the shape of a microchannel 3. The microchannel 3 can have a length of about 10 up to including 60 mm, about 10; 15; 20; 25; 30; 35; 40; 45; 50; 55; or 60 mm, in particular 30; 31; 32; 33; 34; or 35 mm. The width of the microchannel 3 can including the end points e.g. be between 1 and 5 mm; 1 and 4 mm; 1 and 3 mm; 2 and 5 mm; 3 and 5 mm; 2 and 4 mm; 2 and 3 mm, in particular 2.0; 2.1; 2.2; 2.3; 2.4; 2.5; 2.6; 2.7; 2.8; 2.9; or 3.0 mm. Furthermore, the depth of the microchannel 3 can be from 0.2 and up to including 0.6 mm, such as e.g. 0.20; 0.25; 0.30; 0.35; 0.40; 0.45; 0.50; 0.55; or 0.60 mm. A vacuum can be applied to the outlet 17 of the microchannel 3 such that the fluid sample 4 is sucked into the microchannel 3 via the inlet 16. Alternatively, an over pressure having a value above an atmospheric pressure may be applied to inlet 16 of the microchannel 3, such that the fluid sample 4 is pushed into the microchannel 3. The pressure difference between the inlet and the outlet can e.g. be from 0 and up to including 0.40 of the atmospheric pressure (atm), such as e.g. about 0.01; 0.02; 0.03; 0.04; 0.05; 0.10; 0.15; 0.20; 0.25; 0.30; 0.35; or 0.40. Such a pressure difference may lead to a flow speed of the fluid sample from 0 and up to including 100 mm/s, such as e.g. around 5; 10; 15; 20; 25; 30; 35; 40; 45; 50; 55; 60; 65; 70; 75; 80; 85; 90; 95; or 100 mm/s.

The inner wall surface 9 of the body part 2 may comprise a first wall section 11 and a second wall section 12. The first wall section 11 may run substantially parallel to the second wall section 12, wherein the measuring chamber 3 extends between the first wall section 11 and the second wall section 12. Thus, the first wall section 11 may build a lower boundary of the microchannel 3, and the second wall section may build an upper boundary of the microchannel 3. The direction of the fluid propagation x may run substantially parallel to the first wall section 11 and to the second wall section 12. The first wall section 11 and the second wall section 12 may be connected in a closed manner on both lateral sides by lateral elements (not depicted in the views as per FIGS. 3 to 6) which build lateral boundaries of the microchannel 3. The connection between the wall sections 11, 12 and the lateral sections may also be realised in a sealed manner.

As shown by FIG. 4, the surface of the inner wall surface 9 is not even, but comprises a surface structure 13 or tread. This surface structure 13 has a design that helps to avoid that the liquid sample 4 propagates asymmetrically within the measuring chamber 3, when the measuring chamber 3 is filled with the fluid sample 4. In the shown example, both the first wall section 11 and the second wall section 12 comprise the same surface structure 13 in a wavelike or undulating form. The lateral elements may also comprise a surface structure like the wall sections 11 and 12. However, this is not mandatory, and the lateral elements may also have an even surface.

As shown by FIG. 4, the undulating form of the surface structure 13 of the second wall section 12 may be axis-symmetric to the surface structure 13 of the first wall section 11 (in particular axis-symmetric to a longitudinal axis L of the microchannel 3). The surface structure 13 may comprise alternating elevations 14, which are protruding more radial inwardly into the microchannel 3 than reductions 15 or indentations, which are protruding less radial inwardly into the microchannel 3.

The surface structure 13 may be adapted to control a propagation of a flow front 6 of the fluid sample 4 in the direction x while the fluid sample 4 enters into the measuring chamber 3 via the inlet 16, while the fluid sample 4 flows through the measuring chamber 3, and while the fluid sample 4 leaves the measuring chamber 3 via the outlet 17. The shape of the surface structure 13 may be selected depending on a flow speed of the flow front 6 of the fluid sample 4, wherein the flow speed may be applied by a difference in pressure between the inlet 16 and the outlet 17 of the measuring chamber 3. In particular, the surface structure elements (in the shown example, the elevations 14 and the reductions 15) may have an undulating shape (as shown by FIG. 4) or a shape which is e.g. selected from semi-circular, semi-ellipsoidal, triangular, trapezoidal, parallelogram, rectangular, square, any fusions thereof, and any combinations thereof. Also, the surface structure 13 may be in phase or out of phase.

Figure 8:
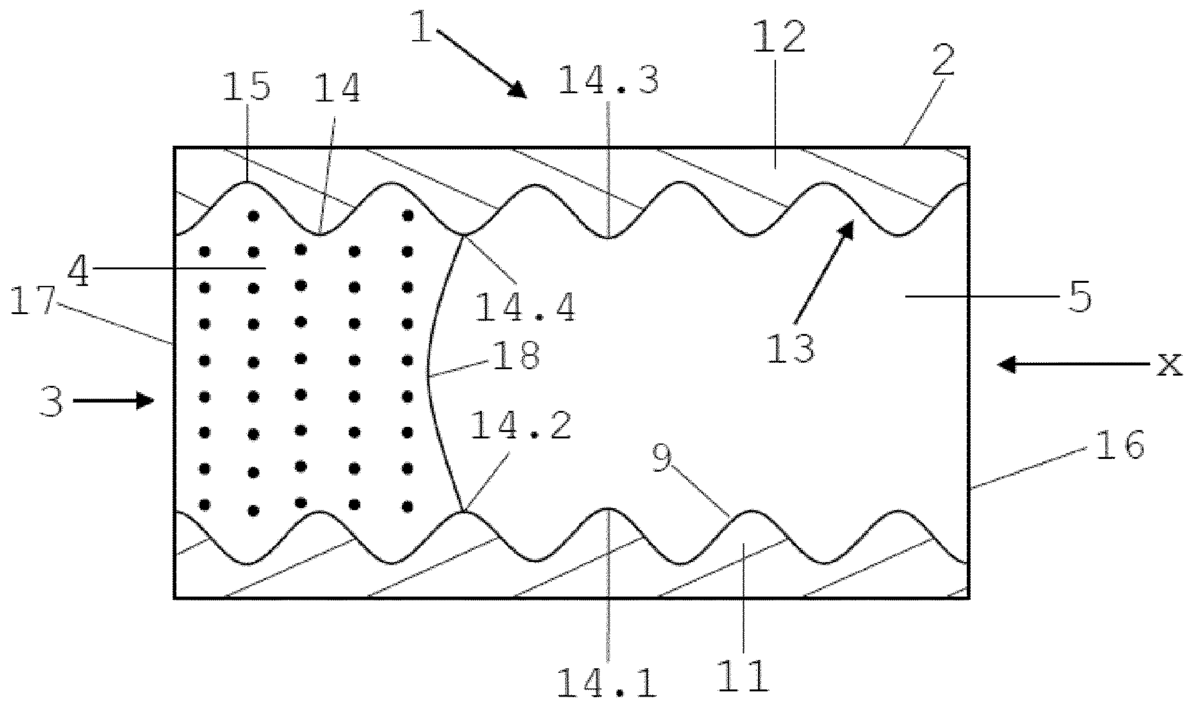
FIG. 8 shows a longitudinal sectional view of the multiple-use device as per FIG. 4, wherein the measuring chamber is being emptied.

The surface structure 13 may enable to restrict a propagation of the fluid sample 4 in the direction x of the fluid propagation in an area of the surface structure 13, when the fluid sample 4 is filled into the measuring chamber 3, and also when the measuring chamber 3 is emptied again (compare FIG. 8). In particular, the design of the surface structure 13 may be such that it enables to restrict the fluid propagation to progress in steps (exemplarily shown in FIGS. 4 to 6). In the shown example, this is achieved because the described design of the surface structure 13 enables to avoid the occurrence of a capillary action and, especially, to control the occurrence of capillary forces of the fluid sample 4, such that the fluid sample 4 progresses in small steps in the direction x of the fluid propagation in the area the surface structure 13.

The surface structure 13 enables that the fluid sample at the inner wall surface 9 does not run ahead compared to the fluid sample situated and moving forward in the middle of the measuring chamber 3. Thereby, it is possible to decrease the risk for an asymmetrically fluid shape or flow front 6. As a result, the risk for trapped air in the fluid sample and residual sample after emptying the measuring chamber 3 can be reduced. Additionally, the number of errors related to poor wettability, for example aborted samples, inhomogeneous liquids or other liquid transport related errors, may be decreased.

Figure 6A:
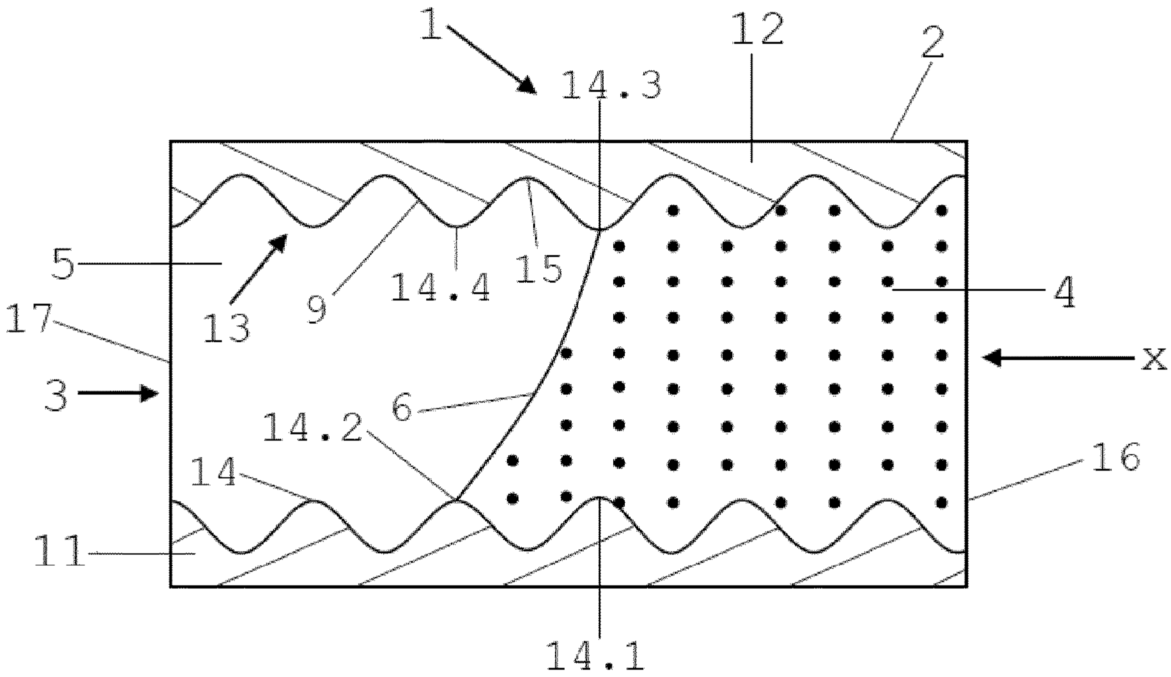
FIG. 6*a* shows a longitudinal sectional view of the device as per FIG. 4, wherein the flow front has moved one step ahead at a first wall section of an inner wall surface, such that the flow front is slightly asymmetrical.
Figure 6B:
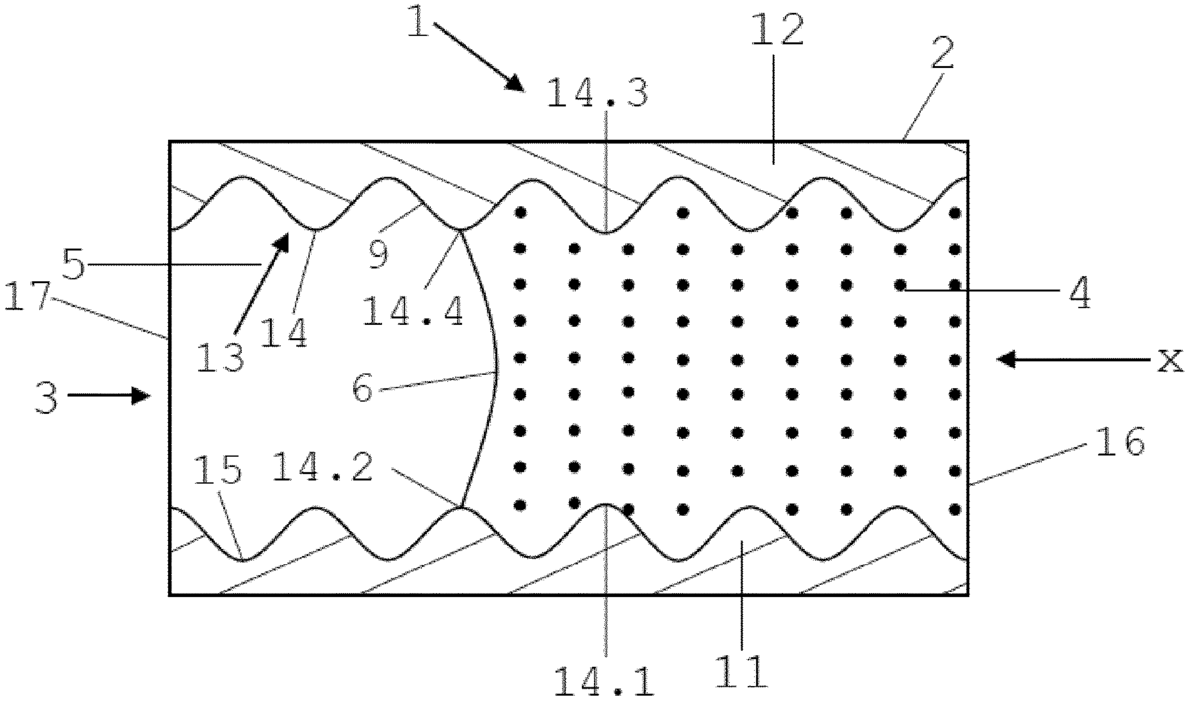
FIG. 6*b* shows a longitudinal sectional view of the device as per FIG. 6*a*, wherein the flow front has moved one step ahead at a second wall section of the inner wall surface, such that the flow front is symmetrical again.
Figure 6C:
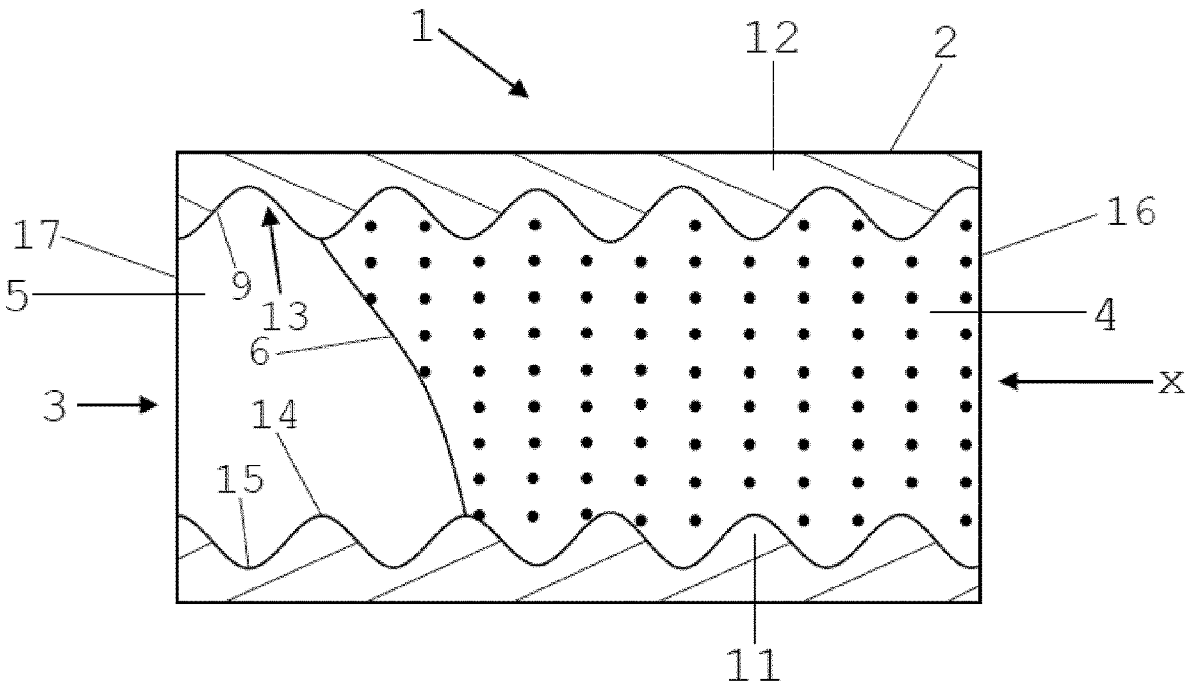
FIG. 6*c* shows a longitudinal sectional view of the device as per FIG. 6*b*, wherein the flow front has moved one step ahead at the second wall section of the inner wall surface, such that the flow front is slightly asymmetrical again.

FIGS. 6*a* to 6*c* show how the surface structure 13 may be adapted to restrict the propagation of the fluid sample 4 in small steps in the direction x of the fluid propagation in the area of the surface structure 13. For the sake of clarity, the sensor system 10 is not shown in FIGS. 6*a* to 6*c*. Starting from the filling status as per FIG. 4, the fluid sample 4, in particular the flow front 6, propagates a first step in the direction x in the area of the first wall section 11, such that the flow front 6 is in the position as depicted by FIG. 6*a*. This first step is an example of a "small" step. Subsequently, starting from the filling status as per FIG. 6*a*, the fluid sample 4, in particular the flow front 6, propagates or follows a second step in the direction x in the area of the second wall section 12, such that the flow front 6 is in the position as depicted by FIG. 6*b*. After that, starting from the filling status as per FIG. 6*b*, the fluid sample 4, in particular the flow front 6, propagates a third step in the direction x in the area of the second wall section 12, such that the flow front 6 is in the position as depicted by FIG. 6*c*. Alternatively, also starting from the filling status as per FIG. 6*b*, the fluid sample 4, in particular the flow front 6, may propagate a third step in the direction x in the area of the first wall section 11 (not depicted by FIG. 6*c*).

This alternating and stepwise propagation of the fluid sample is repeated along the longitudinal axis L of the microchannel 3. In particular, the steps in the area of the first wall section 11 may start at a first elevation 14.1 of the first wall section 11 and may end at a second elevation 14.2 of the first wall section 11, wherein the second elevation 14.2 is adjacent to the first elevation 14.1. Also, the second step in the area of the second wall section 12 may start at a first elevation 14.3 of the second wall section 12 and may end at a second elevation 14.4 of the second wall section 12, wherein the second elevation 14.4 is adjacent to the first elevation 14.3.

Figure 7:
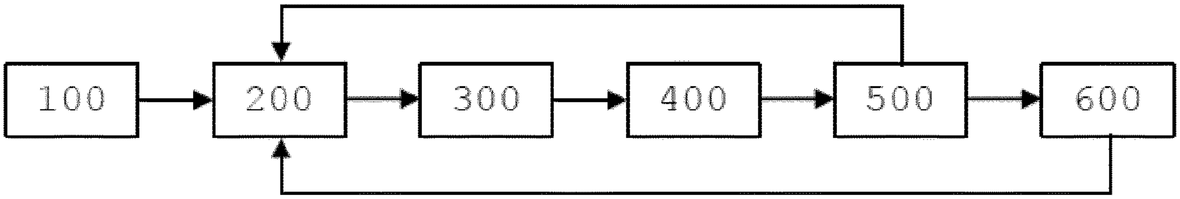
FIG. 7 shows a flowchart of an exemplary embodiment of a method according to the present invention, wherein a fluid sample is analysed, which is accommodated within a device for accommodating a fluid sample.

FIG. 7 shows a flowchart of an exemplary method for analysing a fluid 4 which is accommodated within the multiple-use device 1 as per FIG. 3. In a first step 100, the analysis apparatus 8 as per FIG. 3 is provided. The analysis apparatus 8 comprises the sensor cassette 7 and the multiple-use device 1 as per FIG. 3. In a second step 200, a fluid sample 4 may be filled into the measuring chamber 3 of the device 1, as it has been described above with regards to FIGS. 4 to 6. In a third step 300, the fluid sample 4 accommodated within the measuring chamber 3 of the device 1 may be analysed by means of the analysis apparatus 1, especially by means of sensor system 10. In particular, the fluid sample may be a blood sample, and the analysing step 300 comprises a blood gas analysis. After the analysis of the fluid sample has been completed, the measurement chamber may be emptied in a step 400. This may be done by applying a vacuum to the outlet or an over pressure to the inlet as described above in context with the filling of the measurement chamber.

Subsequently, in a step 500, the measuring chamber may be rinsed by use of a suitable rinsing liquid. Furthermore, in a step 600, a calibration step may be executed to ensure that the sensors are ready and set for analysing a next fluid sample. For example, the measuring chamber may be filled with a calibration liquid (after aforesaid rinsing step).

If readouts from those liquids lie in a certain range, this may indicate that the sensors are performing as intended and that the device is ready for accommodating and analysing a next fluid sample. Then, aforesaid steps 200 to 500 or 200 to 600 may be repeated, in particular with a different fluid sample.

FIG. 8 shows the measuring chamber 3 while it is being emptied. The surface structure 13 may be adapted to control a propagation of an end surface 18 (running opposite to the flow front 6, compare FIGS. 3 to 7) on the very back of the fluid sample 4 in the direction x, in particular while the fluid sample 4 flows through the measuring chamber 3, and while the fluid sample 4 leaves the measuring chamber 3 via the outlet 17. Said end surface 18 may be a gas front, in particular an air front, that propagates through the measuring chamber 3, especially in the same direction x as the flow front 6 of the fluid sample 4.

Figure 9:
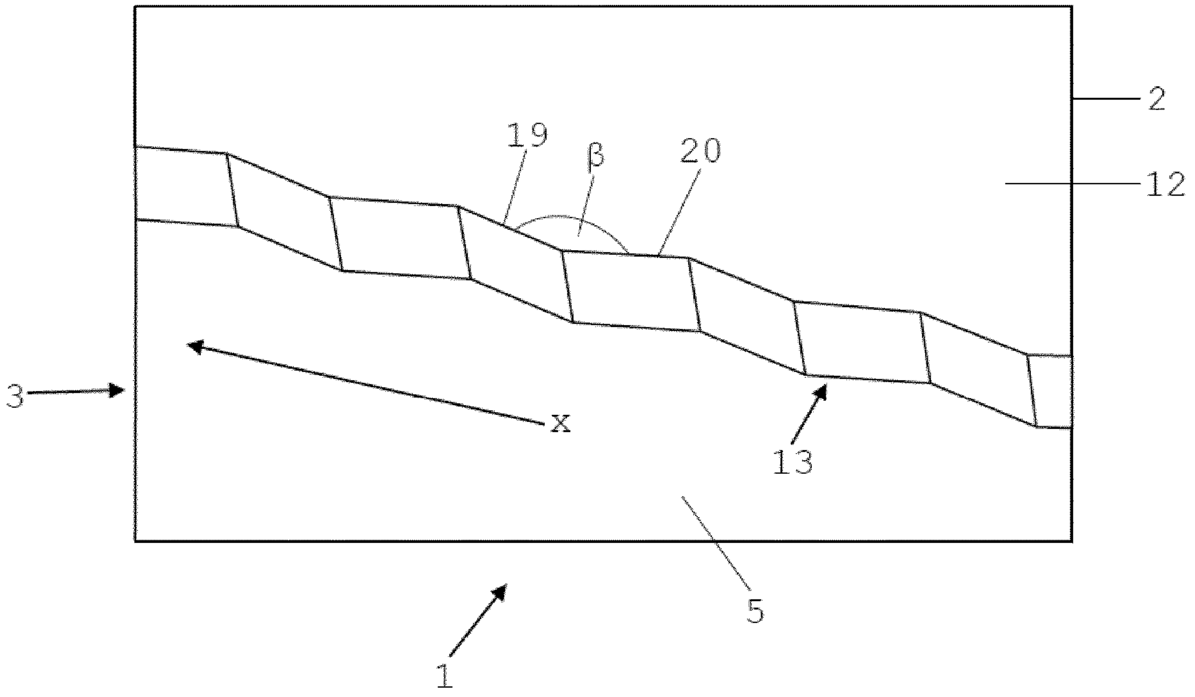
FIG. 9 shows a perspective view of a part of another multiple-use device according to an embodiment of the invention with an alternative shape of a surface structure.

FIG. 9 shows a part of a multiple-use device 1 which comprises a surface structure 13 having a triangular shape. The surface structure 13 comprises a pattern which may be distributed uniformly along or across the whole surface structure 13 in the first wall section 12 and also in the second wall section (not shown, compare FIGS. 3 to 7). In a longitudinal section, the pattern may comprise a row of a first leg 19 of a triangle and a second leg 20 of the triangle, wherein the first leg 19 is connected with the second leg 20. An angle β between the first leg 19 and the second leg 20 may be an obtuse angle, e.g. in the range of 160°, in particular 157.38°. The first leg 19 and the second leg 20 may have the same length. The length of the first leg 19 and/or the second leg 20 may be in the dimension of 1 mm or below, e.g. 0.5 mm.

Figure 10:
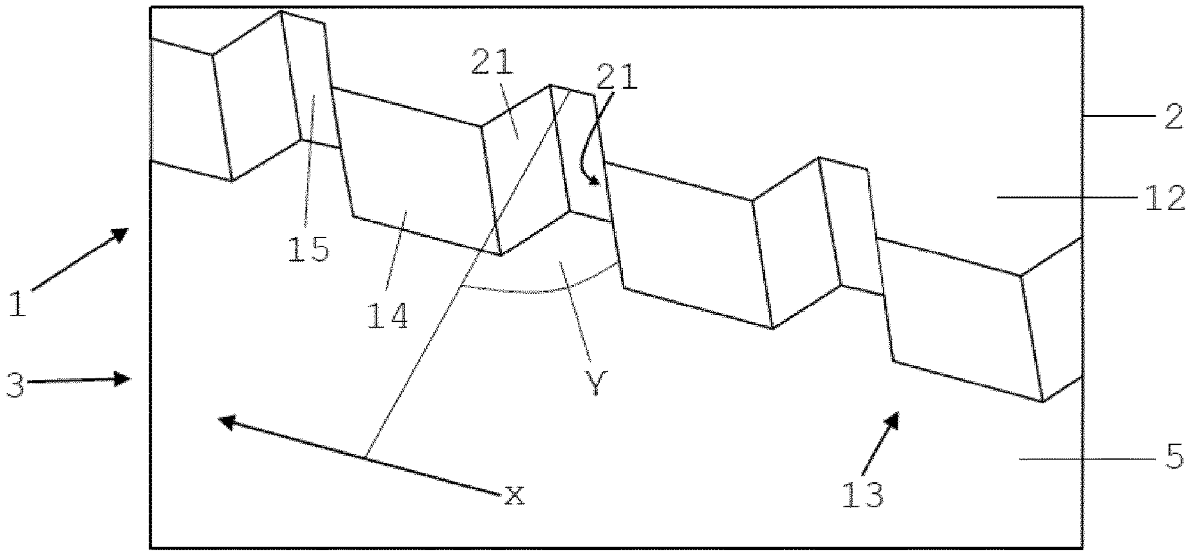
FIG. 10 shows a perspective view of a part of another multiple-use device according to an embodiment of the invention with an alternative shape of a surface structure.

FIG. 10 shows a part of a multiple-use device 1, which comprises a surface structure 13 having a trapezoidal shape. The surface structure 13 comprises a pattern which may be distributed uniformly along or across the whole surface structure 13 in the first wall section 12 and also in the second wall section (not shown, compare FIGS. 3 to 7). In a longitudinal section, the pattern may comprise a row of elevations 14 (which may run parallel to a propagation direction x of the fluid sample 4) and reductions 15, wherein the elevations 14 are connected with the reductions 15 via legs 21. An angle γ between the legs 21 and a perpendicular of the reductions 15 may be in the range of 30°.

Figure 11:
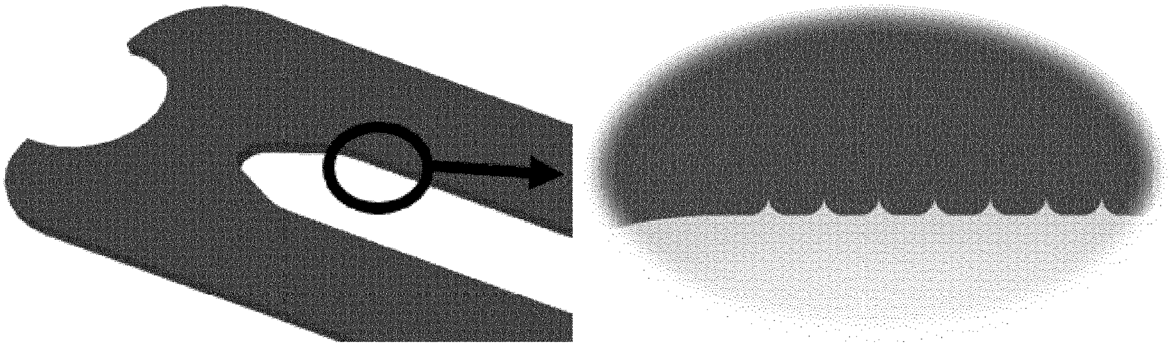
FIG. 11 shows a part of another multiple-use device according to an embodiment of the invention with an alternative shape of a surface structure.

FIG. 11 shows a part of a multiple-use device according to an embodiment of the invention with an alternative shape of a surface structure. The enlargement shows that the surface structure 13 has a shape where the elevation 14 is plane (flat) on the top i.e. the part facing the sample and the reduction 15 has the shape of a tip incision or tip angle as opposed to the plane (flat) reductions 15 in FIG. 10. The sides of the surface structure corresponding to 21 in FIG. 10 may be more or less rounded or straight. Thus, the individual surface structure elements placed adjacent to each other may have the shape spanning from trapezoidal to semi-circular or semi-ellipsoidal with a plane (flat) top.

Figure 12A:
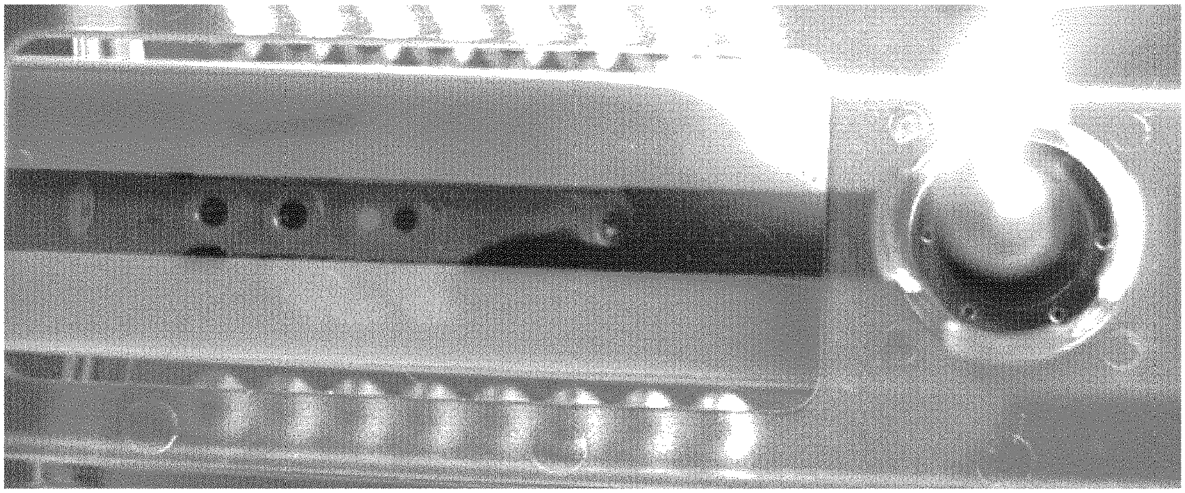
FIG. 12 shows a measuring chamber without (a) and with (b) surface structures at the wall comprising a fluid.
Figure 12B:
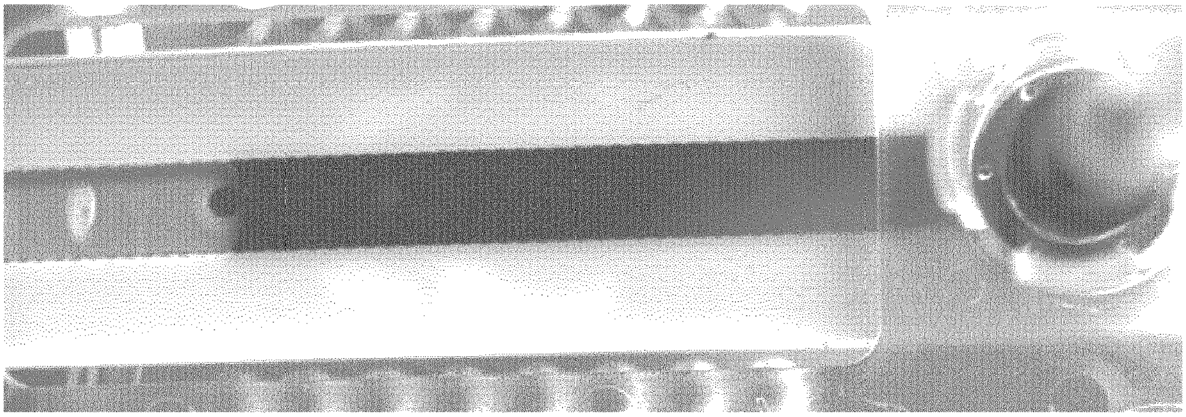

FIG. 12 shows a measuring chamber partly filled with a dark sample running in the flow direction X from right to left with surface structures at the wall (FIG. 12*b*) compare with a measuring chamber without surface structures at the wall (FIG. 12*a*). In the measuring chamber without the presence of surface structures (a) a very uneven flow front and sample deposits can be observed along the wall. The presence of the surface structures in the measuring chamber (b) results in a more even flow front and no sample deposits in the measuring chamber.

The invention claimed is:

1. A multiple-use device comprising:

(a) an inner wall surface defining an outer limit of a measuring chamber for accommodating a fluid sample; and (b) one or more sensors located inside or outside the measuring chamber, wherein the inner wall surface comprises:

a surface structure which is adapted to control a propagation of a flow front of the fluid sample in a direction (x) during moving of the fluid sample into the measuring chamber through an inlet, during passing of the fluid sample through the measuring chamber and during moving of the fluid sample out of the measuring chamber through an outlet, and a first wall section and a second wall section, wherein the first wall section and the second wall section are discrete from each other, wherein the surface structure is positioned along the first wall section and the second wall section, wherein the surface structure comprises at least one surface structure element having a wavelike shape selected from semi-circular, semi-ellipsoidal, triangular, parallelogram, rectangular, square, any fusions thereof, and any combinations thereof, wherein the at least one surface structure element is configured to reduce a formation of trapped air in the fluid sample, wherein the surface structure is selected depending on a flow speed of the flow front of the fluid sample, wherein the flow speed is applied by a difference in pressure between the inlet and the outlet of the measuring chamber and wherein the surface structure is adapted to increase capillary forces of the fluid sample along the surface structure, such that the fluid sample progresses in small steps in the direction (x) of the fluid propagation in the area of the surface structure, and wherein the measuring chamber has a width, including end points, of from 1 to 5 mm, and wherein the measuring chamber is configured for use with one or more of the one or more sensors located inside or outside the measuring chamber.

2. The multiple-use device according to claim 1, wherein the surface structure comprises alternating elevations and reductions.

3. The multiple-use device according to claim 1, wherein the at least one surface structure element is adapted to weaken or to amplify capillary forces in the fluid sample along the surface structure.

4. The multiple-use device according to claim 1, wherein the at least one surface structure element is the same in the first wall section and/or in the second wall section, or differs in the first wall section and/or in the second wall section.

5. The multiple-use device according to claim 1, wherein the surface structure is in phase or out of phase.

6. The multiple-use device according to claim 1, wherein a part of the device which forms the surface structure is made of a material selected from poly(methyl methacrylate), polyethylene terephthalate, polytetrafluoroethylene, polycarbonates, polystyrene, polyethylene, polypropylene, polyvinyl chloride, nylon, polyurethane or styrene dimethyl methacrylate copolymer, or any combination thereof.

7. The multiple-use device according to claim 1, wherein the surface structure of the second wall section is axis-symmetric to the surface structure of the first wall section.

8. The multiple-use device according to claim 1, wherein the first wall section runs substantially parallel to the second wall section, wherein the measuring chamber extends between the first wall section and the second wall section, and wherein the direction (x) of the fluid propagation runs substantially parallel to the first wall section and to the second wall section.

9. The multiple-use device according to claim 1, wherein the measuring chamber has a length of from about 10 up to and including 60 mm.

10. The multiple-use device according to claim 1, wherein the measuring chamber has a depth from 0.2 and up to and including 0.6 mm.

11. The multiple-use device according to claim 1, wherein the surface structure is adapted to control the propagation of the fluid sample in the direction (x), such that the fluid sample propagates a first step in an area of the first wall section and subsequently a second step in an area of the second wall section.

12. The multiple-use device according to claim 11, wherein the first step in the area of the first wall section starts at a first elevation of the first wall section and ends at a second elevation of the first wall section, wherein the second elevation is adjacent to the first elevation, and wherein the second step in the area of the second wall section starts at a first elevation of the second wall section and ends at a second elevation of the second wall section, wherein the second elevation is adjacent to the first elevation.

13. An analysis apparatus comprising a multiple-use device according to claim 1.

14. The analysis apparatus according to claim 13, wherein the analysis apparatus is adapted to analyse a blood sample which is accommodated within the device for accommodating a fluid sample.

15. The analysis apparatus according to claim 14, wherein the analysis apparatus is adapted to conduct a blood gas analysis.

16. A method for analysing a fluid sample which is accommodated within a device for accommodating a fluid sample, the method comprising:

(a) providing an analysis apparatus comprising a multiple-use device according to claim 1;

(b) filling a fluid sample into the measuring chamber of the multiple-use device while also reducing a formation of trapped air within the fluid sample; and (c) analysing the fluid sample accommodated within the measuring chamber of the device by means of the analysis apparatus.

17. The method according to claim 16, wherein the fluid sample is a blood sample, and wherein the analysing comprises a blood gas analysis.

18. The multiple-use device according to claim 1, wherein the at least one surface structure element has a semi-circular or a semi-ellipsoidal shape.

19. The multiple use device according to claim 1, wherein the surface structure has a reduction having a shape of a tip incision or a tip angle.

20. The multiple use device according to claim 1, wherein the at least one surface structure element includes a plurality of surface structure elements placed adjacent to each other.

21. The multiple use device according to claim 1, wherein a height (h) of the at least one surface structure element is less than 0.25 mm.

22. The multiple use device according to claim 1, wherein a height (h) of the at least one surface structure element is less than 0.20 mm.

23. A multiple-use device comprising:

(a) an inner wall surface defining an outer limit of a measuring chamber for accommodating a fluid sample; and (b) one or more sensors located inside or outside the measuring chamber, wherein the inner wall surface comprises:

a surface structure which is adapted to control a propagation of a flow front of the fluid sample in a direction (x) during moving of the fluid sample into the measuring chamber through an inlet, during passing of the fluid sample through the measuring chamber and during moving of the fluid sample out of the measuring chamber through an outlet, and a first wall section and a second wall section, wherein the first wall section and the second wall section are discrete from each other, wherein the surface structure is positioned along the first wall section and the second wall section, wherein the surface structure comprises at least one surface structure element having a shape selected from semi-circular, semi-ellipsoidal, triangular, parallelogram, rectangular, square, any fusions thereof, and any combinations thereof, wherein the at least one surface structure element is configured to reduce a formation of trapped fluid sample in the measuring chamber after attempting to empty the measuring chamber by including an undulating profile having the shape, and wherein the surface structure is selected depending on a flow speed of the flow front of the fluid sample, wherein the flow speed is applied by a difference in pressure between the inlet and the outlet of the measuring chamber and wherein the surface structure is adapted to increase capillary forces of the fluid sample along the surface structure, such that the fluid sample progresses in small steps in the direction (x) of the fluid propagation in the area of the surface structure, wherein the measuring chamber has a width, including end points, of from 1 to 5 mm, and wherein the measuring chamber is configured for use with one or more of the one or more sensors located inside or outside the measuring chamber.

* * * * *